(12) United States Patent
Qu et al.

(10) Patent No.: US 8,165,052 B2
(45) Date of Patent: Apr. 24, 2012

(54) METHOD AND DEVICE FOR MULTIPLEXING BROADCAST SERVICE CHANNEL AND NON-BROADCAST SERVICE CHANNEL

(75) Inventors: Bingyu Qu, Shenzhen (CN); Junwei Wang, Shenzhen (CN); Yingzhe Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 12/058,686

(22) Filed: Mar. 29, 2008

(65) Prior Publication Data

US 2008/0175264 A1 Jul. 24, 2008

Related U.S. Application Data

(63) Continuation of application No. PCT/CN2006/001888, filed on Jul. 28, 2006.

(30) Foreign Application Priority Data

Sep. 29, 2005 (CN) .......................... 2005 1 0108124

(51) Int. Cl.
*H04H 20/71* (2008.01)
(52) U.S. Cl. ....................................................... 370/312
(58) Field of Classification Search .................. 370/436, 370/468, 312
See application file for complete search history.

(56) References Cited

U.S. PATENT DOCUMENTS

| | | | |
|---|---|---|---|
| 5,818,823 A | 10/1998 | Nakanishi et al. | |
| 6,212,182 B1 * | 4/2001 | McKeown | 370/390 |
| 6,477,169 B1 * | 11/2002 | Angle et al. | 370/395.42 |
| 6,711,177 B1 | 3/2004 | Young | |
| 6,885,651 B1 | 4/2005 | Young | |
| 7,050,809 B2 * | 5/2006 | Lim | 455/445 |
| 7,453,898 B1 * | 11/2008 | Cohen et al. | 370/414 |
| 2002/0186710 A1 * | 12/2002 | Alvesalo et al. | 370/468 |
| 2004/0014482 A1 * | 1/2004 | Kwak et al. | 455/522 |
| 2005/0097213 A1 * | 5/2005 | Barrett et al. | 709/231 |
| 2005/0152372 A1 | 7/2005 | Kim et al. | |
| 2005/0245206 A1 * | 11/2005 | Kaikkonen et al. | 455/101 |

(Continued)

FOREIGN PATENT DOCUMENTS

| | | |
|---|---|---|
| CN | 1136737 A | 11/1996 |
| WO | 2005018116 | 2/2005 |

OTHER PUBLICATIONS

International Search Report for International Application No. PCT/CN2006/001888 in English.

(Continued)

*Primary Examiner* — Derrick Ferris
*Assistant Examiner* — Angel Brockman
(74) *Attorney, Agent, or Firm* — Harness, Dickey & Pierce, P.L.C.

(57) ABSTRACT

A method for multiplexing a broadcast service channel and a non-broadcast service channel includes: reserving TF resources for carrying non-broadcast service data on a sub-frame for carrying broadcast service data, and multiplexing the broadcast service data and the non-broadcast service data to the sub-frame for carrying the broadcast service data. Correspondingly, a device for multiplexing a broadcast service channel and a non-broadcast service channel is disclosed. Hence, the system signaling overhead occupied during a TDM process between broadcast service and Unicast service is reduced, and the transmission delay of Unicast service is reduced.

20 Claims, 12 Drawing Sheets

U.S. PATENT DOCUMENTS

2007/0133695 A1* 6/2007 Kotzin .................... 375/260
2008/0032744 A1 2/2008 Khan et al.
2009/0028258 A1* 1/2009 Ma et al. ................. 375/260

OTHER PUBLICATIONS

First Chinese Office Action regarding Application No. 200680011790.7, mailed Jun. 28, 2010. Translation provided by Huawei Technologies Co., Ltd.

Written Opinion of the International Searching Authority regarding Application No. PCT/CN2006/001888, mailed Nov. 30, 2006. Translation provided by Huawei Technologies Co., Ltd.

European Office Action regarding Application No. 06 775 235.2-2411, dated Apr. 8, 2011.

Extended European Search Report regarding Application No. EP06775235 dated Nov. 28, 2008.

* cited by examiner

METHOD AND DEVICE FOR MULTIPLEXING BROADCAST SERVICE CHANNEL AND NON-BROADCAST SERVICE CHANNEL

CROSS-REFERENCE TO RELATED APPLICATIONS

This application is a continuation of International Patent Application No. PCT/CN2006/001888 filed on Jul. 28, 2006. This application claims the benefit of Chinese Patent Application No. 200510108124.2 filed on Sep. 29, 2005. The disclosures of the above applications are incorporated herein by reference.

FIELD

The present disclosure relates to channel multiplexing technologies, in particular, to a method and device for multiplexing a broadcast service channel and a non-broadcast service channel.

BACKGROUND

The statements in this section merely provide background information related to the present disclosure and may not constitute prior art.

Since 1990s, multicarrier technology has become a hot technology of broadband wireless communications. The basic concept of the multicarrier technology lies in that a broadband carrier is divided into a plurality of subcarriers and data is transmitted simultaneously on the divided subcarriers. In most of applications, the width of the subcarrier is less than a coherence bandwidth of a channel. Thus, on a frequency selective channel, the fading on each subcarrier is a flat fading, so that the crosstalk between user data symbols is reduced, and no complex channel equalization is needed. Therefore, it is suitable for the high-rate transmission of data. The existing multicarrier technology has various forms, such as Orthogonal Frequency Division Multiplex Access (OFDMA), Multiplex Carrier CDMA (MC-CDMA), Multiplex Carrier-Direct Spread-CDMA (MC-DS-CDMA) and Time Frequency (TF) domain two-dimensional expansion. Additionally, various expanded technologies based on the technologies are also included.

The Orthogonal Frequency Division Multiplex (OFDM) technology is a representative technology in the multicarrier technologies. In the OFDM technology, a given channel is divided into several orthogonal subchannels in a frequency domain, and it is allowed that spectrums of the subcarriers overlap partially, because different data signals may be separated from the overlapped subcarriers when the different subcarriers are orthogonal to each other.

FIG. 1 is a schematic diagram showing a modulation and demodulation process of a basic OFDM system in the prior art. As shown in FIG. 1, in the OFDM system, a channel coding and interleaving process is first performed on the user data, and the data after the coding and interleaving process is modulated to form a user data symbol through a modulation mode (such as, Binary Phase Shift Keying, BPSK, Quadrature Phase-Shift Keying, QPSK, and Quadrature Amplitude Modulation, QAM), and the user data symbol is modulated to a radio frequency by an OFDM operation. The demodulation process is opposite to this process, and a repeat description thereof is omitted.

In the OFDM operation, firstly, a serial/parallel conversion is performed on the user data symbol to form a plurality of low-rate sub-data streams, and each sub-data stream occupies a subcarrier. The process for mapping each sub-data stream into a corresponding subcarrier may be implemented via an Inverse Discrete Fourier Transformation (IDFT) or Inverse Fast Fourier Transformation (IFFT) process. Through a Cyclic Prefix (CP) adding process, a CP is added to the time domain signal after the IDFT or IFFT process as a guard interval. The intersymbol interference may be reduced greatly or even eliminated, and the orthogonality between channels may be guaranteed, so that inter-channel interference may be reduced greatly.

At present, the Multimedia Broadcast/Multicast Service (MBMS) based on the OFDM multicarrier technology is one of the important services of Long-Time Evolution (LTE). The MBMS service refers to a service in which the network side broadcasts or multicasts the same multimedia data to a plurality of receivers in the network simultaneously. At present, the multimedia data mainly includes stream services and background services.

As described above, in order to reduce the intersymbol interference caused by a multipath delay, a CP is usually added to a time domain signal after the IDFT or IFFT process. The longer the CP added is, the stronger the ability to resist the intersymbol interference caused by multipath delay will be. However, a too long CP may also result in a low transmission efficiency. Therefore, in different OFDM systems, the length of the CP added may be configured as different values according to different applications.

In the LTE, the CP includes a short CP and a long CP. The time length of the short CP is about 4.7 μs, i.e., TCP≈4.7 μs, and is mainly used in a non-broadcast service (Unicast). The time length of the long CP is about 16.7 μs, i.e., TCP≈16.7 μs, and is mainly used in MBMS or cell with a larger diameter. For cells with smaller diameters, or when the system sends a Unicast service, the short CP is employed. When the system sends an MBMS service or when the cell diameter is larger, the long CP is employed.

Usually, a system sends the Unicast service and the MBMS service after a Time Division Multiplexing (TDM) process is performed; in other words, some sub-frames are used for delivering the MBMS service and some sub-frames are used for delivering the Unicast service.

FIG. 2 is a schematic diagram showing the state of the TDM process for the Unicast service and MBMS service in the prior art. In FIG. 2, a short CP is used in Sub-frame 0, Sub-frame 2, Sub-frame 3 and Sub-frame 6 to deliver Unicast service. Base stations between cells schedule and send Unicast service data independently. A long CP is used in Sub-frame 1, Sub-frame 4 and Sub-frame 5 to deliver MBMS service, and each cell sends the same MBMS service data. A User Equipment (UE) demodulates the MBMS service data sent by the system according to corresponding control information. If the UE lies in the cell edge, a plurality of MBMS service signals received from a plurality of cells may be merged through a combining mode, so that the signal-to-noise ratio and the coverage percentage of the cell edge may be improved.

At present, the mode for performing the TDM for the MBMS service and the Unicast service includes a scheduling mode and a designating mode.

The scheduling mode is performed according to the Quality of Service (QoS) of the Unicast service data and MBMS service data. When the QoS requirement for the MBMS service data is stricter than that for the Unicast service data, the MBMS service data will be scheduled firstly; otherwise, the Unicast service data will be scheduled first. Because the MBMS service needs to be sent between a plurality of adjacent cells simultaneously, the QoS requirement for the MBMS service between the cells may be the same. However, the QoS requirement for the Unicast service in each cell may hardly be the same. Therefore, during the TDM process in the scheduling mode a frequent switching between the MBMS service sub-frame and the Unicast service sub-frame will be caused, and the system signaling overhead will be increased greatly.

The designating mode refers to that, only the QoS requirement for the MBMS service will be considered in the two services; in other words, the system will designate the sub-frames for delivering the MBMS service data according to the delay requirement and rate requirement of the MBMS service. As shown in FIG. 2, the system may designate Sub-frame 1, Sub-frame 4 and Sub-frame 5 to deliver the MBMS service data according to the QoS requirement for the MBMS service. Therefore, it can be seen that the delivery priority of the Unicast service will be neglected in the designating mode. As a result, the delay of the Unicast service is increased and the delay is intolerable for the Unicast service with a strict delay requirement.

SUMMARY

According to one aspect of the disclosure, a method for multiplexing a broadcast service channel and a non-broadcast service channel is provided, so that the system signaling overhead occupied when performing a TDM process for the broadcast service and the Unicast service may be reduced, and the transmission delay of the Unicast service may be reduced.

According to another aspect of the disclosure, a device for multiplexing a broadcast service channel and a non-broadcast service channel is provided.

Various embodiments of the disclosure provide the following technical solutions.

A method for multiplexing a broadcast service channel and a non-broadcast service channel, includes: reserving TF resources for carrying non-broadcast service data on a sub-frame for carrying broadcast service data; and multiplexing the broadcast service data and the non-broadcast service data to the sub-frame for carrying the broadcast service data.

In various embodiments, TF resources are reserved on the sub-frame carrying the broadcast service data for carrying the non-broadcast service data with QoS priority.

In various embodiments, the method further includes setting a QoS threshold for the non-broadcast service; and during multiplexing the broadcast service data and the non-broadcast service data, multiplexing the broadcast service data and the non-broadcast service data exceeding the QoS threshold of the non-broadcast service to the sub-frame for carrying the broadcast service data.

In various embodiments, the method further includes generating redundant broadcast service data according to an amount of remaining TF resources if TF resources remain after the non-broadcast service data exceeding the QoS threshold of the non-broadcast service are carried in reserved TF resources; and during multiplexing the broadcast service data and the non-broadcast service data, the method further includes multiplexing the non-broadcast service data exceeding the QoS threshold of the non-broadcast service and generated redundant broadcast service data to the reserved TF resources.

In various embodiments, the method further includes: demodulating, by the UE, the broadcast service data and the redundant broadcast service data multiplexed in the sub-frame for the carrying the broadcast service data, respectively; and combining the broadcast service data and the redundant broadcast service data obtained to obtain the broadcast service data with a high signal to interference plus noise ratio (SINR).

In various embodiments, the redundant broadcast service data is broadcast service data to be sent repeatedly.

In various embodiments, the redundant broadcast service data is check information of the broadcast service data.

In various embodiments, the method further includes performing an interference randomization process on the non-broadcast service data before multiplexing the non-broadcast service data to the reserved TF resources of the broadcast service sub-frame.

In various embodiments, performing the interference randomization process on the non-broadcast service data is implemented by adding a scramble to the non-broadcast service data for scrambling; and different service sending devices add different scrambles to the non-broadcast service data to implement the interference randomization process on the non-broadcast service data.

In various embodiments, the service sending device is Node B in a mobile communication network.

In various embodiments, the interference randomization process for the non-broadcast service data is implemented by interleaving the non-broadcast service data.

In various embodiments, the method further includes performing a cycle shift process on time domain data formed by multiplexing the broadcast service data and the non-broadcast service data to the sub-frame for carrying the broadcast service data.

In various embodiments, when the UE lies at the edge of at least two cells covered by at least two service sending devices, multiplexing and sending, by each of the service sending devices, the same non-broadcast service data in a transmit diversity mode.

In various embodiments, the method further includes: receiving and demodulating, by the UE, the non-broadcast service data sent from at least two service sending devices in a diversity receiving mode; and performing a soft combining process on the non-broadcast service data sent from at least two service sending devices to obtain the non-broadcast service data with a high SINR.

In various embodiments, the service sending device is Node B in a mobile communication network.

In various embodiments, the broadcast service data and the non-broadcast service data is multiplexed to the sub-frame for carrying the broadcast service data in one of the following modes: frequency hopping mode; TDM mode; and FDM mode.

In various embodiments, the network side assigns the sub-frame for carrying the broadcast service data regularly.

In various embodiments, the broadcast service data is MBMS data.

In various embodiments, the non-broadcast service data includes control signaling data of Unicast service and service data of Unicast service.

A device for multiplexing a broadcast service channel and a non-broadcast service channel, includes: a TF resources reserving unit, adapted to reserve TF resources for carrying non-broadcast service data on a sub-frame carrying broadcast service data; and a data multiplexing and delivering unit, adapted to multiplex the broadcast service data and the non-broadcast service data to a broadcast service data sub-frame with TF resources reserved for carrying the non-broadcast service data processed by the TF resource reserving unit.

The disclosure has at least of the following beneficial effects.

In various embodiments, nonbroadcast (such as Unicast) service data is carried by part of the TF resources reserved on a sub-frame for carrying broadcast service data, then the broadcast service data and Unicast service data is multiplexed to the sub-frame for carrying broadcast service data and sent to UE, and then the UE demodulates the broadcast service data and Unicast service data multiplexed in the sub-frame for carrying broadcast service data. Therefore, the disadvantages of the prior art, such as the MBMS service sub-frame and the Unicast service sub-frame are switched frequently and hence the system signaling overhead is increased greatly when the broadcast service data and Unicast service data is scheduled based on the relation between the QoS of broadcast service and the QoS of Unicast service, may be avoided.

Additionally, if part of the TF resources reserved in the MBMS service sub-frame are used for carrying Unicast service data of high QoS, the disadvantage of the prior art, such as the transmission delay of Unicast service is increased because the QoS of broadcast service is considered firstly in the prior art, may be avoided, and it is favorable to reduce the transmission delay of Unicast service with a stricter realtime requirement.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 11:
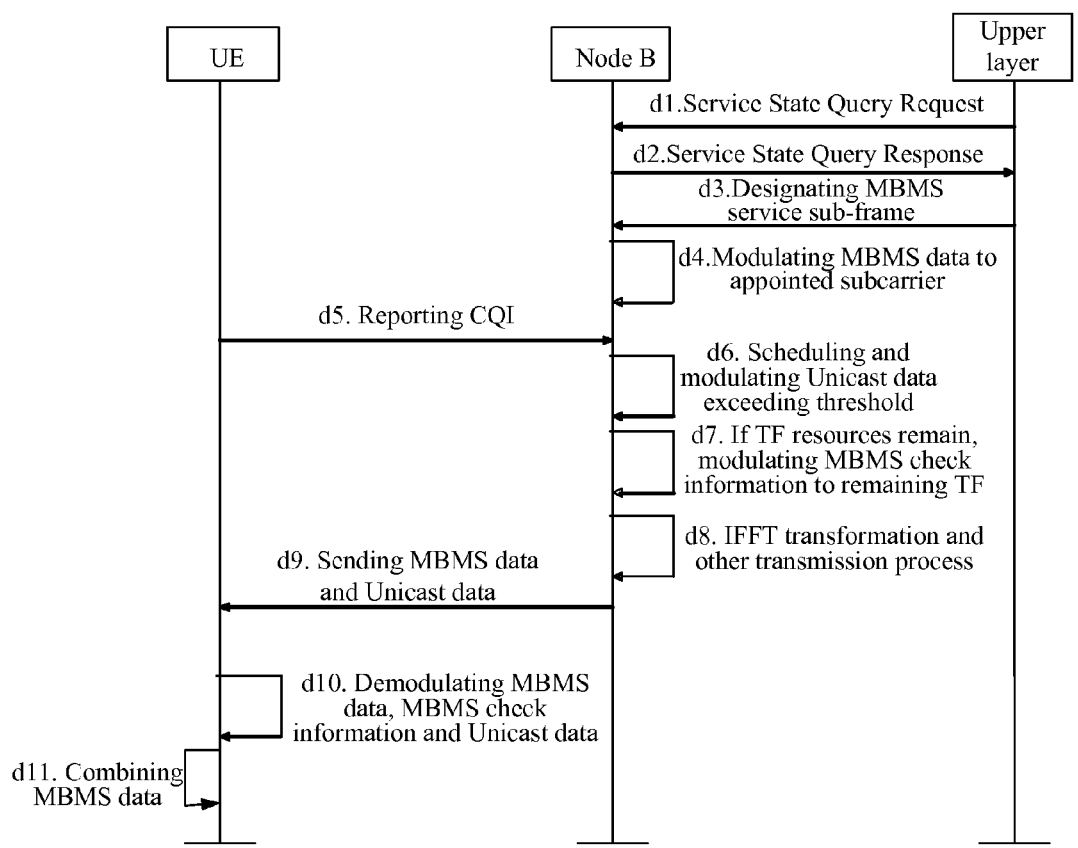
Figure 12:
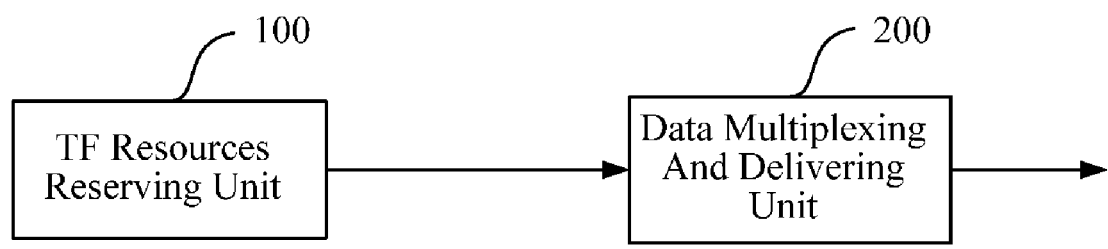

FIG. 11 is a schematic diagram showing an embodiment in which the MBMS service data, the Unicast service data and the redundant MBMS service data is multiplexed to an MBMS service sub-frame based on a method according to the present disclosure; and FIG. 12 is a block diagram showing the main structure of the device for multiplexing the broadcast service channel and the non-broadcast service channel according to the present disclosure.

DETAILED DESCRIPTION

The following description is merely exemplary in nature and is not intended to limit the present disclosure, application, or uses.

Various embodiments of the present disclosure solve the problem that the system signaling overhead is increased due to the frequent switching between the MBMS service sub-frame in a long CP application and the Unicast service sub-frame in a short CP application using the conventional scheduling method, and the problem that the delay is caused in a delay-sensitive Unicast service using the conventional designating method.

Various embodiments of the method for multiplexing the broadcast service channel and the non-broadcast service channel according to the present disclosure will now be illustrated in detail in conjunction with the drawings.

Figure 3:
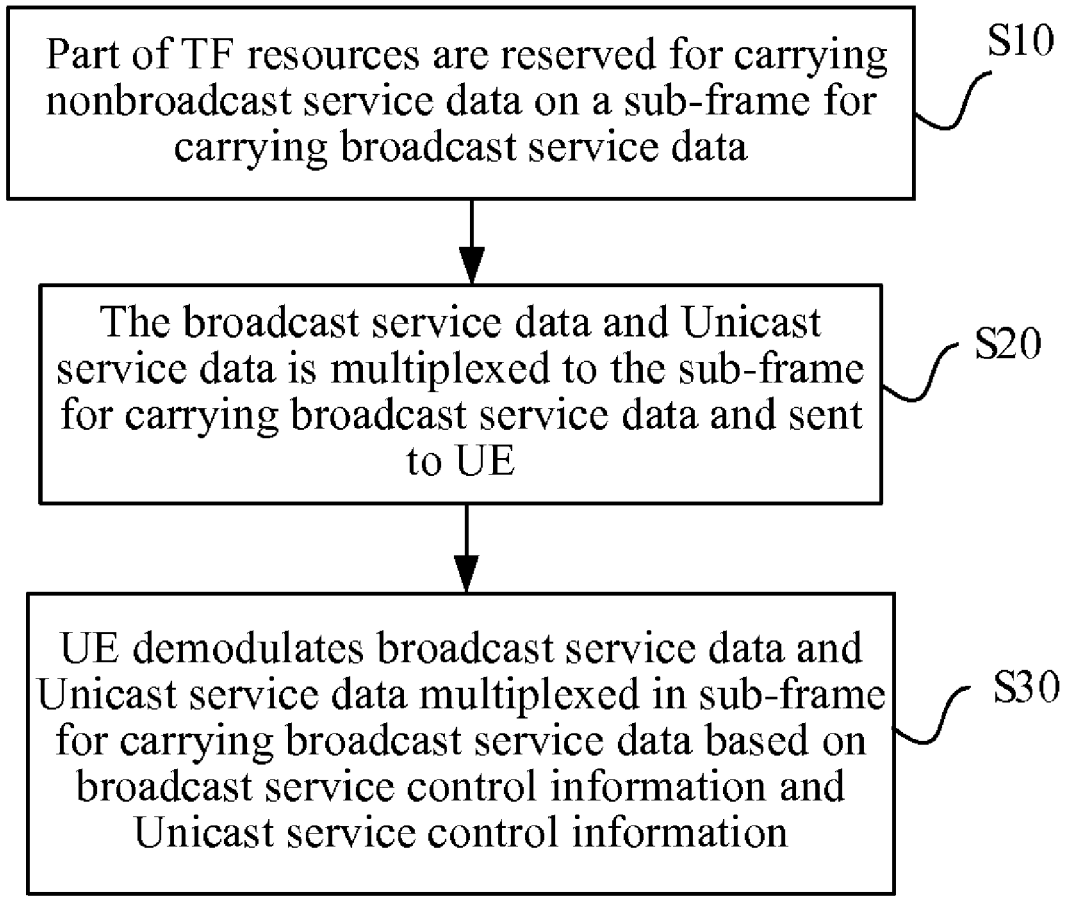
FIG. 3 is a flow chart of a method for multiplexing a broadcast service channel and a non-broadcast service channel according to the present disclosure.

FIG. 3 is a flow chart of a method for multiplexing a broadcast service channel and a non-broadcast service channel according to various embodiments of the present disclosure. In various embodiments, the method includes the following steps.

Step S10: Part of the Time Frequency (TF) resources are reserved for carrying the nonbroadcast (Unicast) service data on the sub-frame for the carrying broadcast service data. Herein, the sub-frame for carrying the broadcast service data may be assigned by the network side periodically. In order to alleviate the transmission delay in the delay-sensitive Unicast service caused by the conventional designating method, the TF resources reserved in the sub-frame for carrying the broadcast service data may carry the Unicast service data with a higher QoS priority firstly.

For example, a QoS threshold of a Unicast service may be preset.

Step S20: The broadcast service data and the Unicast service data is multiplexed to a sub-frame for carrying broadcast service data and then sent to a UE. Moreover, in order to alleviate the transmission delay in the delay-sensitive Unicast service caused by the conventional designating method, during multiplexing the broadcast service data and Unicast service data, the broadcast service data and the Unicast service data which is higher than the set QoS threshold of the Unicast service is multiplexed to the sub-frame for carrying the broadcast service data.

The broadcast service data and Unicast service data may be multiplexed to the sub-frame for carrying the broadcast service data in a frequency hopping mode, or in a FDM mode, or in a TDM mode.

Step S30: The UE respectively demodulates the broadcast service data and the Unicast service data multiplexed in the sub-frame for carrying the broadcast service data, based on broadcast service control information and Unicast service control information (the control information is the information received from a control channel).

In various embodiments, the above broadcast service data may be the MBMS service data which are often used in 3G networks, and the above Unicast service data may be, but not limited to, the control signaling data and the service data in the Unicast service. For example, a detailed description will now be given by taking the MBMS service as the broadcast service. The broadcast service mentioned in the embodiments of the disclosure may also be other broadcast service. The implement of the broadcast service is the same as that of the MBMS service and repeat descriptions thereof are omitted.

Figure 4:
FIG. 4 is a schematic diagram showing a process for multiplexing the MBMS service and the Unicast service with a strict QoS requirement according to a method of the present disclosure.

FIG. 4 is a schematic diagram showing a process for multiplexing the MBMS service and the Unicast service with a strict QoS requirement according to a method of the disclosure. Specifically, when a cell schedules an MBMS service sub-frame (the MBMS service sub-frame may be assigned by the network side regularly according to a certain time rule), the system will reserve part of the TF resources for delivering Unicast service data with a stricter delay requirement. In the Sub-frame, the multiplexing of MBMS service data and Unicast service data may be implemented in a frequency hopping mode, TDM mode or FDM mode. The main implementation is as follows.

1. Node B performs a constellation mapping on MBMS service data after channel coding, puts the mapped complex signal on a subcarrier appointed by the system, and reserves a part of the subcarriers for scheduling Unicast service data according to configurations (the system will be preconfigured to inform Node B which subcarriers are allowed to keep TF resources).

2. Node B schedules the Unicast service data with a strict QoS requirement.

3. Node B performs the channel coding on scheduled Unicast service data, performs the constellation mapping, and puts the mapped complex signal on the reserved subcarrier.

Figure 5:
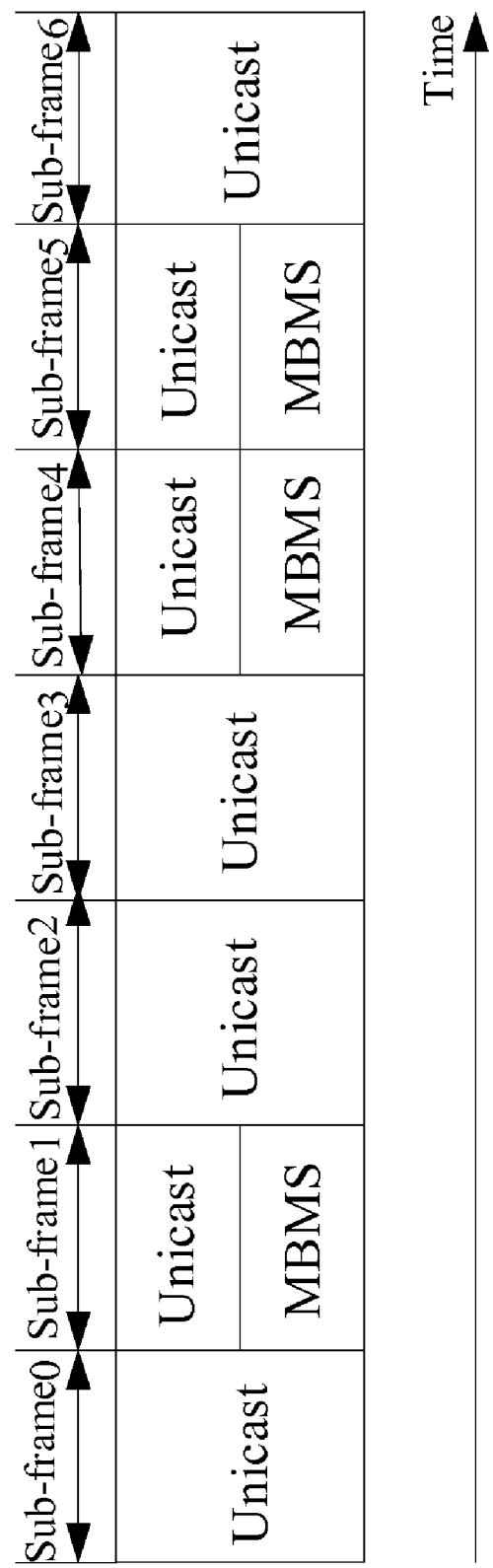
FIG. 5 is a state diagram showing the process in which the Unicast service data with a strict QoS requirement and the MBMS service data is multiplexed in an MBMS service sub-frame.

4. The Unicast service data with a strict QoS requirement and the MBMS service data is multiplexed; then multiplexed data is transmitted via Node B after several processes, such as IFFT transformation and CP addition in accordance with the OFDM process of the prior art shown in FIG. 1. FIG. 5 is a state diagram showing the process for multiplexing the Unicast service data with a strict QoS requirement and the MBMS service data in an MBMS service sub-frame.

5. After UE receives the signal, the UE demodulates the MBMS service data and Unicast service data multiplexed in the MBMS service sub-frame according to the MBMS service control information and Unicast service control information respectively.

In S20, another situation may also exist, i.e. TF resources still remain after Unicast service data exceeding the QoS threshold of Unicast service are carried in the TF resources reserved in the MBMS service sub-frame. At this point, the system may generate redundant broadcast service data corresponding to the amount of the remaining TF resources.

Subsequently, during the multiplexing the broadcast service data and Unicast service data, the Unicast service data exceeding the QoS threshold of Unicast service and the redundant broadcast service data need to be multiplexed to the TF resources reserved in the MBMS service sub-frame.

Thus, when the UE receives the signal, the UE needs to demodulate the broadcast service data and the redundant broadcast service data multiplexed in the sub-frame for carrying the broadcast service data according to the broadcast service control information, and merge the broadcast service data and the redundant broadcast service data obtained, so as to obtain the broadcast service data with a high SINR.

The system may take part of the broadcast service data to be sent repeatedly as the redundant broadcast service data according to the amount of the remaining TF resources, and may take the check information of the broadcast service data as the redundant broadcast service data.

Figure 6:
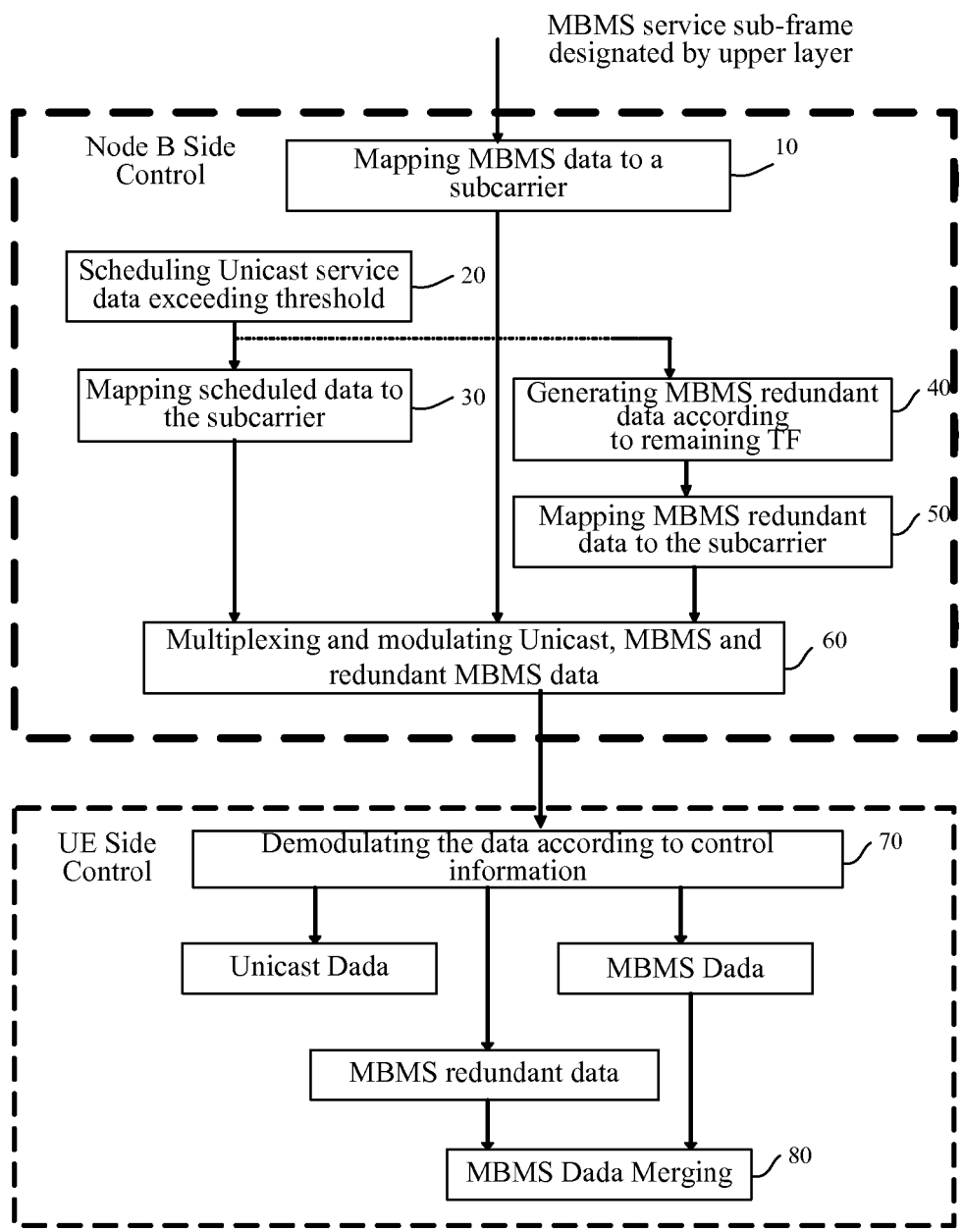
FIG. 6 is a schematic diagram showing the process for multiplexing the MBMS service, the Unicast service with a strict QoS requirement and the redundant MBMS service according to a method of the present disclosure.

FIG. 6 is a schematic diagram showing the process for multiplexing the MBMS service, the Unicast service with a strict QoS requirement and the redundant MBMS service in accordance with a method of the disclosure. Because in the MBMS service sub-frame, reserved TF resources are only used for delivering Unicast service data with a strict delay requirement. In other words, in the above solution shown in FIG. 4, a QoS threshold of Unicast service is set and only Unicast service data exceeding the threshold are scheduled. Moreover, Unicast service situations in different cells are different, in other words, some cells may have a Unicast service exceeding the threshold, while some cells may not have the Unicast service exceeding the threshold, and additionally, the TF resources reserved in the MBMS service sub-frame may not be fully occupied even if the Unicast service exceeding the threshold exists. Therefore, TF resources which are not occupied may be used for delivering redundant information of MBMS service data (including repeated MBMS service data and check bit information of MBMS service data). A UE pertaining to the cell may receive and demodulate the MBMS service data and the redundant MBMS service data, and merge the MBMS service data and the redundant MBMS service data, so that the SINR of the MBMS service is improved. The implementation of the above process is as follows.

10. Node B performs a constellation mapping on the MBMS service data after the channel coding, puts a mapped complex signal on a subcarrier appointed by the system, and reserves part of the subcarriers for scheduling the Unicast service data.

20. Node B only schedules the Unicast service data exceeding the QoS threshold preset.

30. Node B performs the channel coding on a scheduled Unicast service data, performs the constellation mapping, and puts a mapped complex signal on a reserved subcarrier.

40. When the system determines that part of the reserved TF resources remain, the system generates redundant MBMS service data information corresponding to the amount of the remaining TF resources.

50. Node B performs the constellation mapping on the redundant MBMS service data information, and puts a mapped complex signal on a remaining subcarrier.

60. Node B multiplexes the Unicast service data exceeding a preset QoS threshold, the MBMS service data and the redundant MBMS service data to the MBMS service sub-frame.

Figure 7:
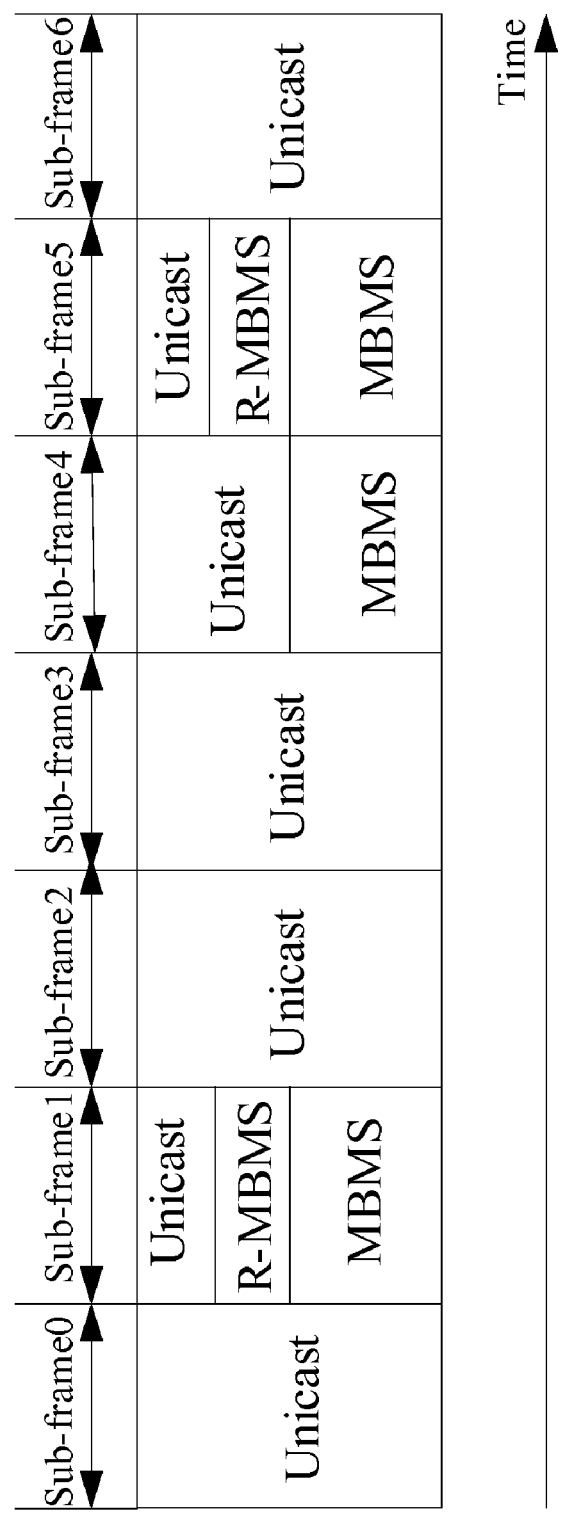
FIG. 7 is a state diagram showing the process in which the Unicast service data which is higher than a preset QoS threshold, the MBMS service data and the redundant MBMS service data is multiplexed to an MBMS service sub-frame.

FIG. 7 is a state diagram showing the process for multiplexing the Unicast service data exceeding the preset QoS threshold, the MBMS service data and the redundant MBMS service data to an MBMS service sub-frame. As shown in FIG. 7, redundant MBMS (R-MBMS) service data is multiplexed in Sub-frame 1 and Sub-frame 5, and no R-MBMS data is multiplexed in Sub-frame 4.

Figure 1:
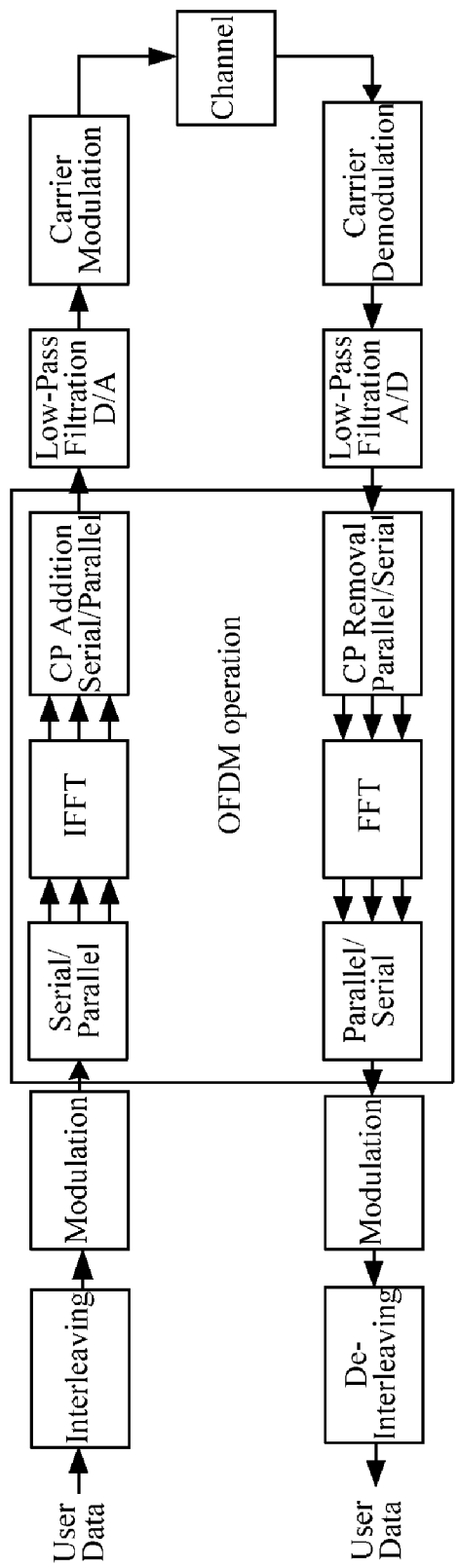
FIG. 1 is a schematic diagram showing the modulation and demodulation process of a basic OFDM system in the prior art.
Figure 2:
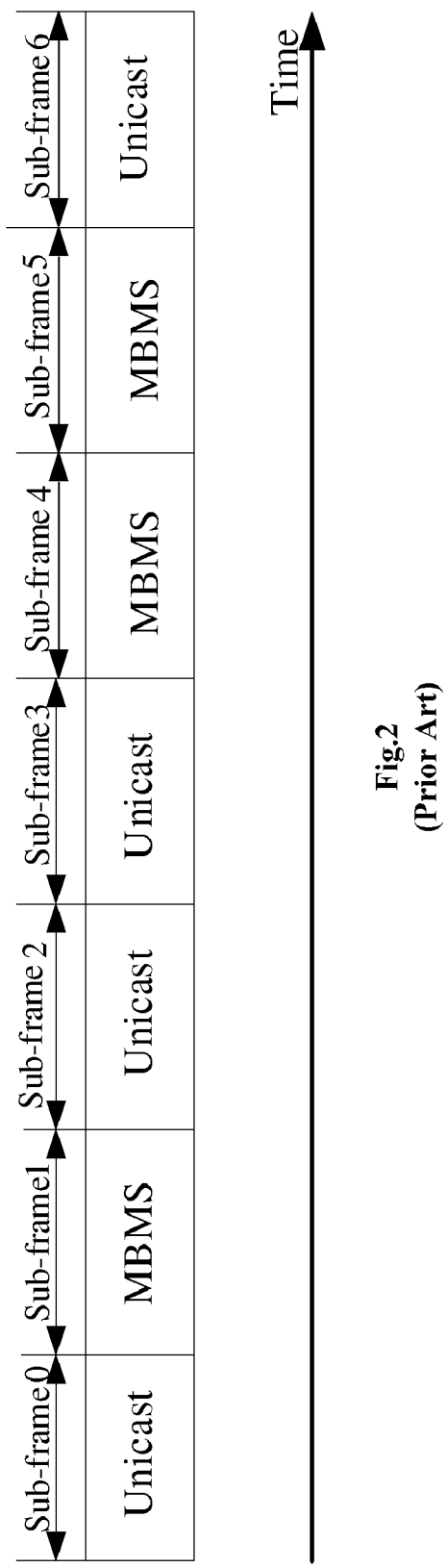
FIG. 2 is a schematic diagram showing a state during performing a TDM process for the Unicast service and MBMS service in the prior art.

Then multiplexed data is transmitted via Node B after several processes, such as IFFT transformation and CP addition in accordance with the OFDM process of the prior art shown in FIG. 1.

70. After a UE receives the signal, the UE demodulates the MBMS service data, the Unicast service data and the redundant MBMS service data multiplexed in the MBMS service sub-frame respectively, according to the MBMS control information and Unicast control information received and demodulated on a control channel.

80. The UE merges the MBMS service data and the redundant MBMS service data demodulated, and finally generates the MBMS service data information with a high SINR.

Various embodiments of the disclosure will be described as follows.

Embodiment 1

Figure 8:
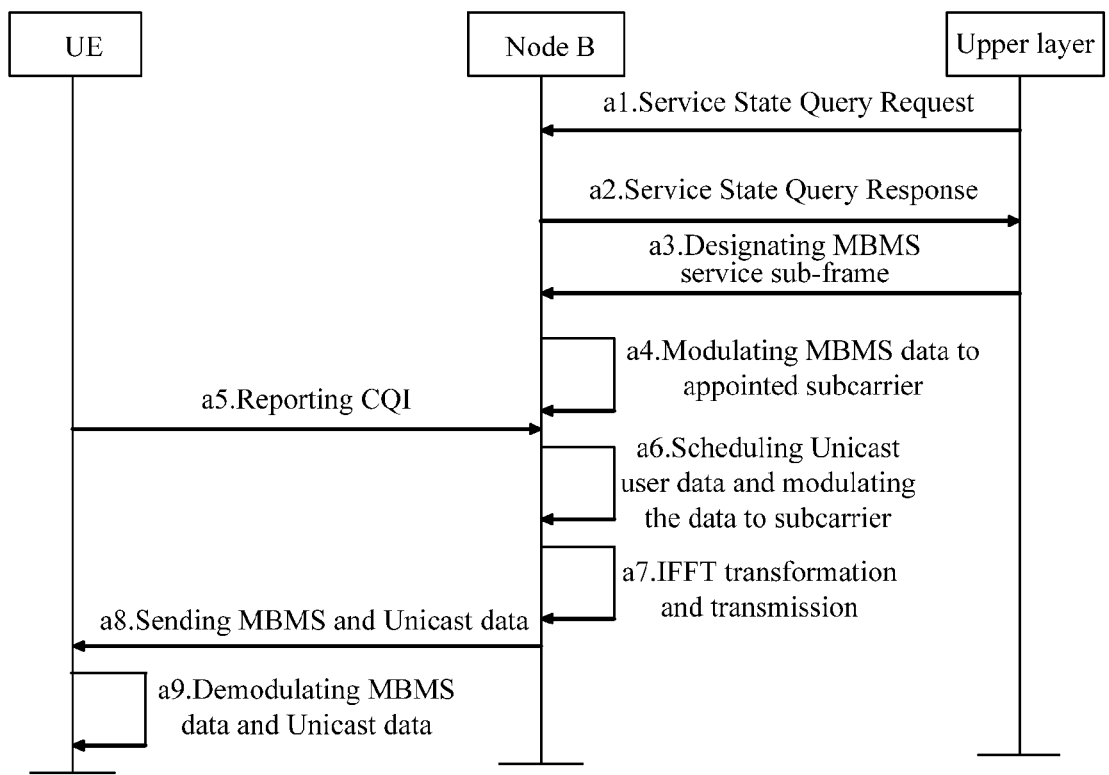
FIG. 8 is a schematic diagram showing an embodiment in which the MBMS service data and the Unicast service data is multiplexed to an MBMS service sub-frame based on the principle of a method according to present application.

FIG. 8 is a schematic diagram showing a process for multiplexing the MBMS service data and the Unicast service data to an MBMS service sub-frame according to an embodiment of the disclosure. In this embodiment, the MBMS service data and the Unicast service data is multiplexed in the long CP application. The network system environment in this embodiment includes three entities: a UE, a Node B and an upper layer. Node B is adapted to schedule services. The upper layer refers to a functional entity above Node B (such as RNC and switching-side device). The specific implementation process is as follows.

a1. The upper layer sends a service state query request command to Node B. The service state query request command is used for instructing Node B to query the service situation of Node B including QoS of each service, cell load and so on.

a2. Node B queries and records the service state of Node B, and sends a service state query response to the upper layer.

a3. The upper layer arranges the MBMS service sub-frame according to the service situation of Node B and QoS of the MBMS service, and then the upper layer sends a designated MBMS service sub-frame command to Node B and delivers the MBMS service data to Node B at the same time.

a4. Node B modulates the MBMS service data on the designated MBMS service sub-frame, puts the modulated MBMS service data to the subcarrier set by the system, and reserves part of the TF resources on the subcarrier.

a5. The UE reports a Channel Quality Indicator (CQI). This report process is a periodic process and may take place at any moment between a1 and a4.

a6. Node B schedules and modulates the Unicast service data according to the CQI reported by the UE and the QoS requirement for the Unicast service data of a user, and then puts the Unicast service data to the reserved TF resources on the subcarrier.

a7. Node B performs the OFDM transformation processes shown in FIG. 1, such as IFFT process and the parallel/serial transformation, on the frequency domain data formed after the MBMS service data and the Unicast service data is multiplexed to the MBMS service sub-frame.

a8. Node B sends the multiplexed frequency domain data to the UE in the current cell.

a9. The UE demodulates the MBMS service data and the Unicast service data sent to the UE in the received signal respectively, according to the MBMS service control information and the Unicast service control information received from a control channel.

Embodiment 2

Figure 9:
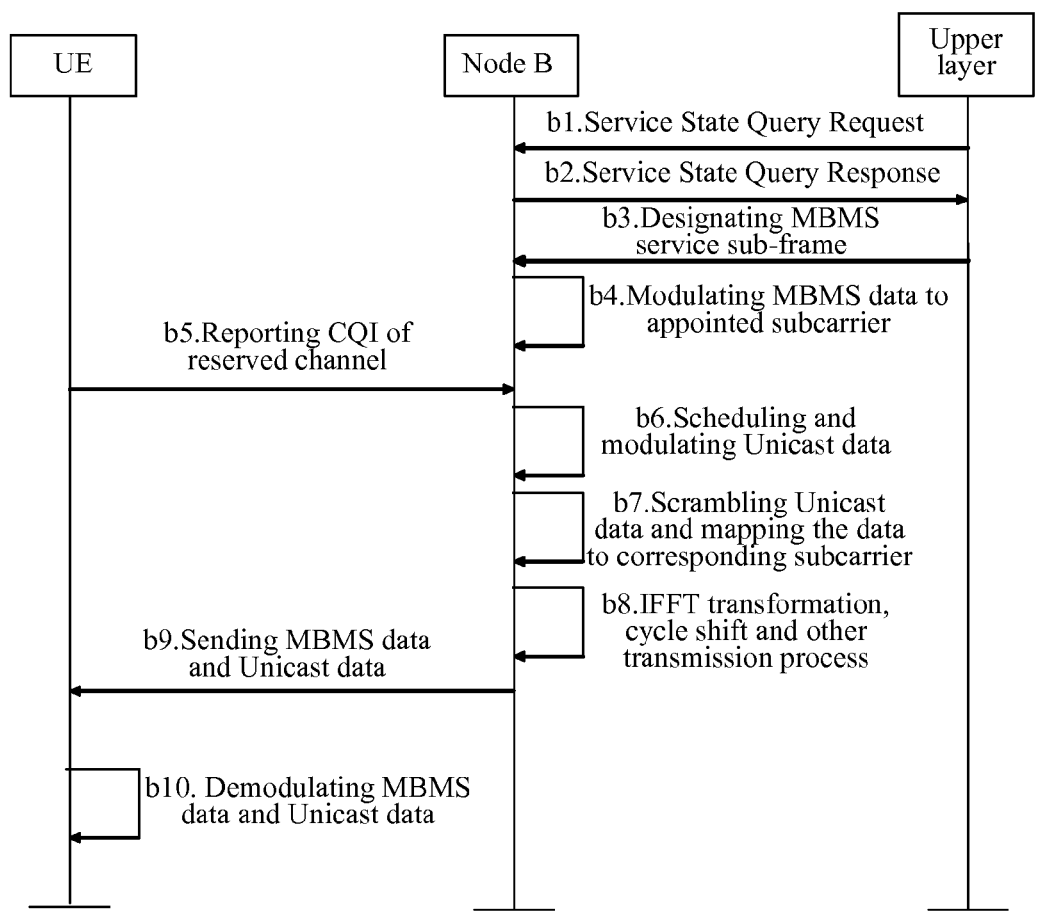
FIG. 9 is a schematic diagram showing an embodiment in which an interference randomization process is performed for the Unicast service data and a cycle shift process is performed on the multiplexed time domain data when the MBMS service data and the Unicast service data is multiplexed according to a method of the present disclosure.

FIG. 9 is a schematic diagram showing the embodiment in which an interference randomization process is performed on the Unicast service data and a cycle shift process is performed on the multiplexed time domain data when the MBMS service data and the Unicast service data is multiplexed according to a method of the disclosure. Based on the OFDM multicarrier technology, frequency selective diversity gain needs to be obtained between different Nodes B via the cycle shift process. Usually, MBMS service data sent from different Nodes B are the same. Hence, when Node B sends the MBMS service data, the cycle shift process may be performed to improve the frequency selective gain. Additionally, because the Unicast service data is scheduled on the reserved TF resources in the MBMS service sub-frame, the interference between neighboring cells is likely to occur. Therefore, it is necessary to scramble the Unicast service data via an interference randomization process, and the interference randomization process is implemented by adding a scramble in the Unicast service data to generate interference, and the interference randomization process may be implemented in different interleaving modes. The specific implementation is as follows.

b1. The upper layer sends a service state query request command to Node B, and the service state query request command is used for instructing Node B to query the service situation of Node B including QoS of each service, cell load and so on.

b2. Node B queries and records the service state, and sends a service state query response to the upper layer.

b3. The upper layer arranges an MBMS service sub-frame according to the service situation of Node B and the QoS of MBMS service, and then the upper layer sends a designated MBMS service sub-frame command to Node B, and delivers the MBMS service data to Node B at the same time.

b4. Node B modulates the MBMS service data on the designated MBMS service sub-frame, puts the modulated MBMS service data to the subcarrier set by the system, and reserves part of the TF resources on the subcarrier.

b5. The UE reports the CQI of the reserved channel. This report process is a periodic process and may take place at any moment between steps b1 to b4.

b6. Node B schedules and modulates the Unicast service data according to the CQI reported by the UE and the QoS requirement for the Unicast service data of a user.

b7. The Node B performs an interference randomization process on the modulated Unicast service data to lower the interference between neighboring cells. For example, a scramble is added to the Unicast service data to perform the scrambling process and the Unicast service data after the scrambling process are mapped to the reserved TF resources on the subcarrier. In order to achieve a better interference randomization effect, different scramble sequences are used for different Nodes B to perform the scrambling process on the Unicast service data to be sent.

b8. The Node B performs the IFFT transformation process on the frequency domain data formed after the MBMS service data and Unicast service data is multiplexed to the MBMS service sub-frame, and performs the cycle shift process on the time domain data after the IFFT transformation process. The offset in the cycle shift process is designated by the upper layer. Finally, the OFDM transformation processes shown in FIG. 1, such as the parallel/serial transformation, are performed on the multiplexed time domain data.

b9. Node B sends the data after the multiplexing process to the UE in current cell.

b10. The UE demodulates the MBMS service data and the Unicast service data sent to the UE in the received signal respectively, according to the MBMS service control information and Unicast service control information received from a control channel.

Embodiment 3

When the UE lies at the edge of at least two cells covered by at least two Nodes B, the receiving signal power of the UE is low while the interference is increased, so that the SINR of the signal is too low. Thus, in order to solve the problem that the SINR of the Unicast service data is too low when the UE lies at the edge of at least two cells, at least two Nodes B may be employed to perform the transmit diversity. In other words, when the UE lies at the edge of at least two cells covered by at least two Nodes B, the at least two Nodes B will send the same Unicast service data, and the same coding mode and interleaving mode are employed. Because the at least two Nodes B send the same Unicast service data, the problem of the interference between neighboring cells no longer exists, and the scramble sequence employed between Nodes B needs to be the same, or no scrambling process is performed. At the same time, the UE at the receiving-side needs to receive the signals sent from Nodes B in a diversity receiving mode and demodulate the Unicast service data in the signals sent from Nodes B in a soft combining mode.

Figure 10:
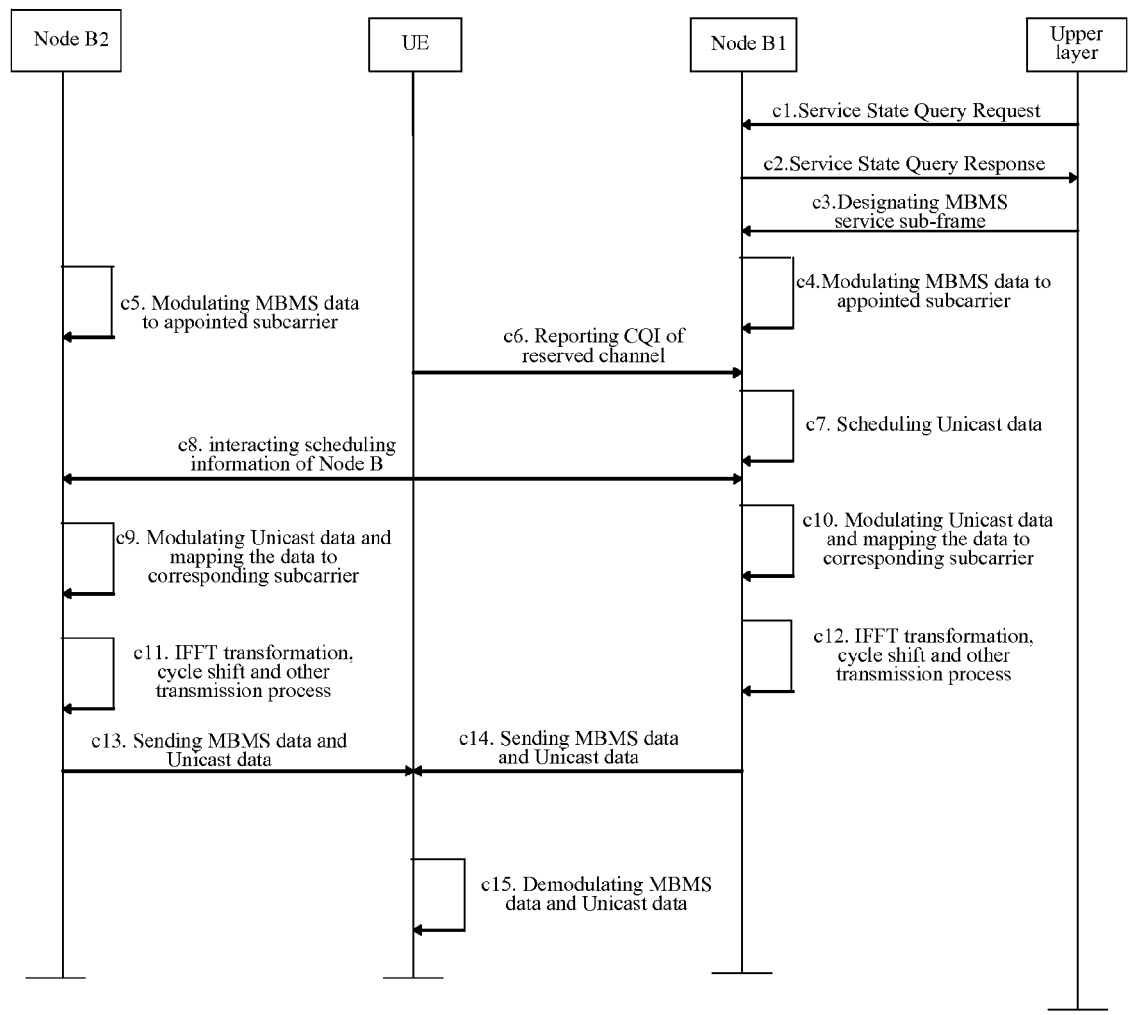
FIG. 10 is a schematic diagram showing the process in which Node B transmits the multiplexed data in a transmit diversity mode when the UE lies at the edge of two cells covered by two Nodes B based on a method according to the present disclosure.

FIG. 10 is a schematic diagram showing the process in which Node B transmits the multiplexed data in the transmit diversity mode when the UE lies at the edge of two cells covered by two Nodes B, according to a method of the disclosure. The specific implementation is as follows.

c1. The upper layer sends a service state query request command to Node B1. The service state query request command issued is used for instructing Node B1 to query the service situation, including the QoS of the service and the cell load.

c2. Node B1 queries and records the service state, and sends a service state query response to the upper layer.

c3. The upper layer arranges the MBMS service sub-frame according to the service situation of each Node B and the QoS of the MBMS service, then the upper layer sends a designated MBMS service sub-frame command to Node B1, and delivers the MBMS service data to Node B1.

c4. Node B1 modulates the MBMS service data on the designated MBMS service sub-frame, puts the modulated MBMS service data to a subcarrier set by the system, and reserves part of the TF resources on the subcarrier.

c5. After the same processes as shown from c1 to c3 are performed on Node B2, Node B2 modulates the MBMS service data on the designated MBMS service sub-frame, puts the modulated MBMS service data to a subcarrier set by the system, and reserves part of the TF resources on the subcarrier.

c6. The UE reports the CQI of the reserved channel to Node B1 (if the UE knows which channel is the reserved channel, the UE directly reports the CQI of the reserved channel; otherwise, the UE reports the CQI of all the channels). This report process is a periodic process and may take place at any moment between c1 to c4.

c7. Node B1 schedules and modulates the Unicast service data according to the CQI reported by the UE and the QoS requirement for the Unicast service data of a user.

c8. Scheduling information of the Unicast service data is interacted between Node B1 and Node B2. If Node B1 schedules the Unicast service data of a UE at the edge of the cell, the following processes will be performed.

c9. Node B2 modulates the Unicast service data of the UE, performs the constellation mapping, and puts the mapped complex signal to a subcarrier set by the system.

c10. Node B1 modulates the Unicast service data of the UE, performs the constellation mapping, and puts the mapped complex signal to a subcarrier set by the system. The coding mode employed at c10 is the same as the coding mode employed when Node B2 processes the Unicast service data.

c11. Node B2 performs an IFFT transformation process on the frequency domain data formed after the MBMS service data and the Unicast service data is multiplexed to the MBMS service sub-frame, and performs a cycle shift process on the time domain data after the IFFT transformation process. The offset employed in the cycle shift process is designated by the upper layer. Finally, the OFDM transformation processes shown in the FIG. 1, such as parallel/serial transformation, are performed on the multiplexed time domain data.

c12. Node B1 performs the IFFT transformation process on the frequency domain data formed after the MBMS service data and Unicast service data is multiplexed to the MBMS service sub-frame, and performs the cycle shift process on the time domain data after the IFFT transformation process. The offset employed in the cycle shift process is designated by the upper layer. Finally, the OFDM transformation processes shown in FIG. 1, such as parallel/serial transformation, are performed on the multiplexed time domain data.

c13. Node B2 sends the multiplexed data to a UE at the edge of the cell.

c14. Node B1 sends the multiplexed data to the UE at the edge of the cell.

c15. The UE demodulates the MBMS service data and the Unicast service data sent to the UE in the signals sent from Node B1 and Node B2 in the soft combining mode, according to the MBMS service control information and the Unicast service control information received from the control channel.

Embodiment 4

FIG. 11 is a schematic diagram showing the process in which the MBMS service data, the Unicast service data and the redundant MBMS service data is multiplexed to an MBMS service sub-frame, according to a method of the disclosure. In this embodiment, the MBMS service data, the Unicast service data and the redundant MBMS service data is multiplexed with a long CP application. The network system environment in this embodiment includes three entities: UE, Node B and an upper layer. Node B is adapted to schedule services. The upper layer refers to a functional entity above Node B (such as RNC and switching-side device). The specific implementation process is as follows.

b1. The upper layer sends a service state query request command to Node B. The service state query request command is used for instructing Node B to query the service situation of Node B including QoS of each service, cell load and so on.

b2. Node B queries and records the service state of Node B, and sends a service state query response to the upper layer.

d3. The upper layer arranges the MBMS service sub-frame according to the service situation of Node B and QoS of the MBMS service, then the upper layer sends a designated MBMS service sub-frame command to Node B and delivers the MBMS service data to Node B at the same time.

d4. Node B modulates the MBMS service data on the designated MBMS service sub-frame, puts the modulated MBMS service data to the subcarrier set by the system, and reserves part of the TF resources on the subcarrier.

d5. The UE reports the CQI. This report process is a periodic process and may take place at any moment between a1 and a4.

d6. Node B schedules and modulates the Unicast service data higher than a preset threshold according to the CQI reported by the UE and the QoS requirement for the Unicast service data of a user, and then puts the Unicast service data to the reserved TF resources on the subcarrier.

d7. Node B checks whether the TF resources reserved in the MBMS service sub-frame remain, and generates redundant check information of the MBMS service data corresponding to the amount of the remaining TF resources, and then puts the redundant check information to the remaining TF resources.

d8. Node B performs the OFDM transformation processes shown in FIG. 1, such as IFFT process and the parallel/serial transformation, on the frequency domain data formed after the MBMS service data, the Unicast service data and the redundant check information are multiplexed to the MBMS service sub-frame.

d9. Node B sends the multiplexed frequency domain data to the UE in current cell.

d10. The UE demodulates the MBMS service data, the Unicast service data sent to the UE, and the redundant check information of the MBMS service data in the received signal respectively, according to the MBMS service control information and the Unicast service control information received from the control channel.

d11. The UE merges the demodulated MBMS service data and the redundant check information of MBMS service data, and calculates MBMS service data with a higher SINR.

As stated above, according to various embodiments of the disclosure, it can be seen that: through a method of the disclosure, the disadvantage that the system signaling overhead is increased due to the frequent switching between the MBMS service sub-frame with a long CP and the Unicast service sub-frame with a short CP may be released, and the problem that the transmission delay is cased in the delay-sensitive Unicast service data may be solved, so that the reliability for receiving the MBMS service data and Unicast service data by the UE may be improved. Meanwhile, when the UE lies at the edge of cells, the SINR at the edge of cell may be improved through using the transmit diversity mode for a plurality of Nodes B.

Corresponding to a method of the disclosure, a device for multiplexing a broadcast service channel and a non-broadcast service channel is further provided herein. FIG. 12 is a block diagram showing the structure of the device for multiplexing the broadcast service channel and the non-broadcast service channel according to the disclosure. The device includes TF resource reserving unit 100 and data multiplexing and delivering unit 200. The function of each unit is described as follows.

TF resource reserving unit 100 is adapted to reserve TF resources for carrying non-broadcast service data on a sub-frame carrying broadcast service data.

Data multiplexing and delivering unit 200 is adapted to multiplex the broadcast service data and the non-broadcast service data to the broadcast service data sub-frame with TF resources reserved for carrying non-broadcast service data after being processed by TF resource reserving unit 100, and send the broadcast service data and the non-broadcast service data to a UE.

Moreover, the detailed implementation of the device according to various embodiments of the disclosure is similar to implementation of the method according to various embodiments of the disclosure, and repeat descriptions thereof are omitted.

Additional advantages and modifications will readily occur to those skilled in the art. Therefore, the disclosure in its broader aspects is not limited to the specific details and representative embodiments shown and described herein. Accordingly, various modifications and variations may be made without departing from the scope of the disclosure as defined by the appended claims and their equivalents.

The invention claimed is:

1. A method for multiplexing a broadcast service channel and a non-broadcast service channel, comprising:
   reserving, by a service sending device, Time Frequency, TF, resources for carrying non-broadcast service data with a high quality of Service, QoS, priority in a Multimedia Broadcast/Multicast Service, MBMS, sub-frame carrying broadcast service data, wherein the broadcast service data comprises MBMS service data, and wherein the non-broadcast service data comprises unicast service data; and
   multiplexing the broadcast service data and the non-broadcast service data with a high QoS priority in the MBMS sub-frame.

2. The method according to claim 1, further comprising:
   setting, by the service sending device, a QoS threshold for the non-broadcast service; and
   during multiplexing the broadcast service data and the non-broadcast service data, multiplexing, by the service sending device, the broadcast service data and the non-broadcast service data exceeding the QoS threshold of the non-broadcast service in the MBMS sub-frame.

3. The method according to claim 2, further comprising:
   generating, by the service sending device, redundant broadcast service data according to an amount of remaining TF resources if TF resources remain after the non-broadcast service data exceeding the QoS threshold of the non-broadcast service are carried in the reserved TF resources; and
   during multiplexing the broadcast service data and the non-broadcast service data, the method further comprises multiplexing, by the service sending device, the non-broadcast service data exceeding the QoS threshold of the non-broadcast service and generated redundant broadcast service data to the reserved TF resources.

4. The method according to claim 3, further comprising:
   demodulating, by a User Equipment, UE, the broadcast service data and the redundant broadcast service data multiplexed in the MBMS sub-frame, respectively; and
   combining, by the UE, the broadcast service data and the redundant broadcast service data obtained.

5. The method according to claim 4, wherein the redundant broadcast service data is broadcast service data to be sent repeatedly.

6. The method according to claim 4, wherein the redundant broadcast service data is check information of the broadcast service data.

7. The method according to claim 1, further comprising:
   performing, by the service sending device, an interference randomization process on the non-broadcast service data before multiplexing the non-broadcast service data to the reserved TF resources of the MBMS sub-frame.

8. The method according to claim 7, wherein performing the interference randomization process on the non-broadcast service data is implemented by adding a scramble to the non-broadcast service data for scrambling; and
   different service sending devices add different scrambles to the non-broadcast service data to implement the interference randomization process on the non-broadcast service data.

9. The method according to claim 7, wherein the interference randomization process for the non-broadcast service data is implemented by interleaving the non-broadcast service data by the service sending device.

10. The method according to claim 1, further comprising:
    performing, by the service sending device, a cycle shift process on time domain data formed by multiplexing the broadcast service data and the non-broadcast service data to the MBMS sub-frame.

11. The method according to claim 1, further comprising: when the UE lies at the edge of at least two cells covered by at least two service sending devices, multiplexing and sending, by each of the service sending devices, the same non-broadcast service data in a transmit diversity mode.

12. The method according to claim 11 further comprising: receiving and demodulating, by the UE, the non-broadcast service data sent from at least two service sending devices in a diversity receiving mode; and performing a soft combining process on the non-broadcast service data sent from at least two service sending devices.

13. The method according to claim 1, wherein the service sending device is Node B in a mobile communication network.

14. The method according to claim 1, further comprising: multiplexing, by the service sending device, the broadcast service data and the non-broadcast service data to the MBMS sub-frame in one of the following modes:
frequency hopping mode;
Time-division multiplexing, TDM, mode; and
Frequency-division multiplexing, FDM, mode.

15. The method according to claim 1, further comprising: assigning, by a network side, the MBMS sub-frame.

16. The method according to claim 1, wherein the unicast service data comprises at least one of control signaling data of unicast service and service data of unicast service.

17. An apparatus, comprising:
a service sending device in a communication system, including:
a Time Frequency, TF, resources reserving unit, configured to reserve TF resources in a Multimedia Broadcast/Multicast Service, MBMS, sub-frame carrying broadcast service data, the reserved TF resources in the MBMS sub-frame being configured to carry non-broadcast service data with a high Quality of Service, QoS, priority, wherein the broadcast service data comprises MBMS service data, and wherein the non-broadcast service data comprises unicast service data; and
a data multiplexing and delivering unit, configured to multiplex the broadcast service data and the non-broadcast service data in the MBMS sub-frame with TF resources reserved for carrying the non-broadcast service data processed by the TF resource reserving unit.

18. The method of claim 1, further comprising:
determining whether QoS priorities of first and second sets of non-broadcast service data each exceed a QoS threshold;
multiplexing the first set of non-broadcast service data with the broadcast service data and carrying the multiplexed data in a first single sub-frame, wherein the QoS priority of the first set of non-broadcast service data is determined exceeding the QoS threshold;
carrying the second set of non-broadcast service data in a second single sub-frame, wherein the QoS priority of the second set of non-broadcast service data is determined not exceeding the QoS threshold;
transmitting the first single sub-frame; and
transmitting the second single sub-frame.

19. A User Equipment (UE), comprising:
a receiver, configured to receive service data and control information from a base station, the service data comprising broadcast service data and non-broadcast service data with a high quality of service, QoS, priority, the broadcast service data and the non-broadcast service data with a high QoS priority being multiplexed in a Multimedia Broadcast/Multicast Service, MBMS, sub-frame carrying the broadcast service data, wherein the broadcast service data comprises MBMS service data, and wherein the non-broadcast service data comprises unicast service data; and
a demodulator, configured to demodulate broadcast service data and non-broadcast service data according to the control information.

20. The UE, according to claim 19, wherein the service data further comprises redundant broadcast service data multiplexed in the MBMS sub-frame, and wherein the demodulator further configured to demodulate the broadcast service data and the redundant broadcast service data according to the control information.

* * * * *